US012273293B2

(12) United States Patent
Atawia

(10) Patent No.: US 12,273,293 B2
(45) Date of Patent: Apr. 8, 2025

(54) FAST RADIO ACCESS NETWORK PARAMETER CONTROL

(71) Applicant: Dell Products, L.P., Round Rock, TX (US)

(72) Inventor: Ramy Atawia, Kanata (CA)

(73) Assignee: Dell Products, L.P., Round Rock, TX (US)

( * ) Notice: Subject to any disclaimer, the term of this patent is extended or adjusted under 35 U.S.C. 154(b) by 435 days.

(21) Appl. No.: 17/657,781

(22) Filed: Apr. 4, 2022

(65) Prior Publication Data
US 2023/0318779 A1 Oct. 5, 2023

(51) Int. Cl.
*H04L 5/00* (2006.01)
*H04W 24/08* (2009.01)

(52) U.S. Cl.
CPC ........... *H04L 5/0051* (2013.01); *H04W 24/08* (2013.01)

(58) Field of Classification Search
CPC ............... H04W 36/08; H04W 72/232; H04W 72/0457; H04W 36/0077; H04W 24/04; H04W 24/08; H04L 5/0051
USPC ................................ 370/328, 329, 330, 221
See application file for complete search history.

(56) References Cited

U.S. PATENT DOCUMENTS

| 12,136,986 B2* | 11/2024 | Yang ..................... H04L 5/0094 |
| 2009/0175165 A1* | 7/2009 | Leighton ............. H04L 61/2575 370/221 |
| 2019/0246406 A1* | 8/2019 | Xu .......................... H04L 5/001 |
| 2023/0337075 A1* | 10/2023 | Zhang .................. H04W 36/08 |

FOREIGN PATENT DOCUMENTS

| EP | 2346272 A1 | 7/2011 |
| EP | 2693655 A1 | 5/2014 |
| EP | 3855842 A1 | 7/2021 |
| WO | 2019241976 A1 | 12/2019 |
| WO | 2020131128 A1 | 6/2020 |
| WO | 2022098174 A1 | 5/2022 |

OTHER PUBLICATIONS

"5G; NR; Multiplexing and channel coding," Technical Specification, 3GPP TS 38.212 version 15.2.0 Release 15, Jul. 2018, 101 pages.

(Continued)

*Primary Examiner* — David Q Nguyen
(74) *Attorney, Agent, or Firm* — Amin, Turocy & Watson, LLP

(57) ABSTRACT

The described technology is generally directed towards fast radio access network (RAN) parameter control for cellular communication networks. Example methods can use a radio intelligent controller (RIC) in a core network to adjust parameters used for cellular communications between a RAN and user devices. The RIC and RAN components can apply a set of actions to adjust the parameters more quickly and with less overhead than, e.g., adjustment of radio resource control (RRC) parameters. Parameters adjusted according to the techniques herein can include downlink control information (DCI) parameters and medium access control (MAC) control element (CE) parameters.

20 Claims, 8 Drawing Sheets

(56) References Cited

OTHER PUBLICATIONS

"5G; NR; Medium Access Control (MAC) protocol specification," Technical Specification, 3GPP TS 38.321 version 15.3.0 Release 15, Sep. 2018, 77 pages.
"O-RAN Working Group 3 Near-Real-time RAN Intelligent Controller E2 Service Model (E2SM), RAN Control," Technical Specification, ORAN.WG3.E2SM-RC-v01.01.00, 2020, 267 pages.
"3rd Generation Partnership Project; Technical Specification Group Radio Access Network; NR; Radio Resource Control (RRC) protocol specification," 3GPP TS 38.331 V16.7.0, Sections 5.3-5.3.15.2, Dec. 2021, 78 pages.
International Search Report and Written Opinion received for PCT Application Serial No. PCT/US22/53068 dated Apr. 26, 2023, 16 pages.
Notification Concerning Transmittal of International Preliminary Report on Patentability for International application No. PCT/US2022/053068 dated Oct. 17, 2024.
Communication pursuant to Rules 161(1) and 162 EPC for EP application No. 22850828.9 dated Nov. 12, 2024.

\* cited by examiner

FAST RADIO ACCESS NETWORK PARAMETER CONTROL

BACKGROUND

The open radio access networks (O-RAN) standard for cellular communication networks has introduced a radio intelligent controller (RIC) to continuously monitor radio access network (RAN) performance and provide optimization actions or reconfigurations that achieve target performance values. The current O-RAN standard uses a defined set of parameters, more particularly, parameters associated with radio resource configuration (RRC) messages. However, RRC messages are typically sent at a slow pace (e.g., hundreds of milliseconds apart) and RRC messages are associated with large signaling overhead as well as service interruptions. The use of only RRC parameters therefore hampers RIC optimization gains. There is a need in the art to expand upon the O-RAN standard in order to support improved function of the RIC to optimize RANs.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
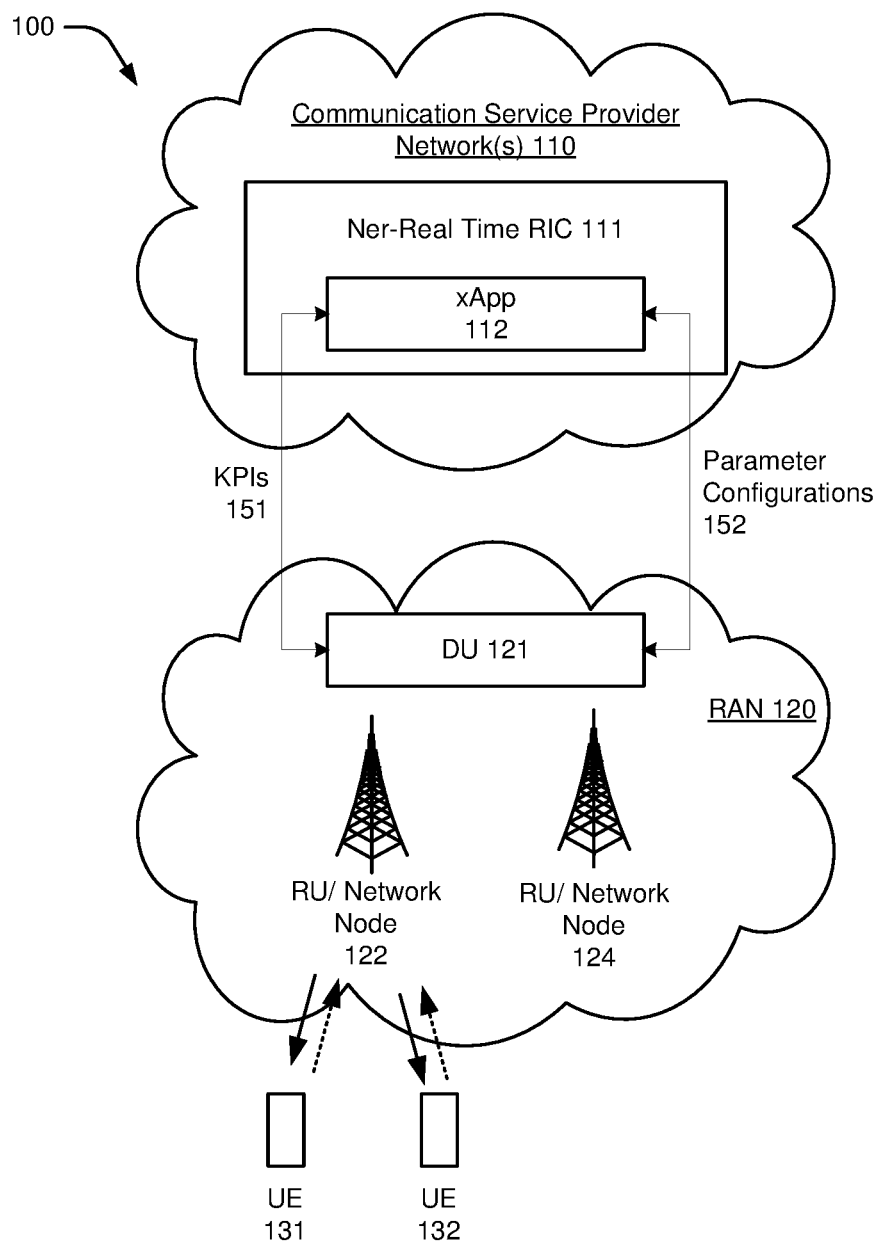
FIG. 1 illustrates an example wireless communication system configured for fast adjustment of RAN parameters, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards fast radio access network (RAN) parameter control for cellular communication networks. Example methods can use a radio intelligent controller (RIC) in a core network to adjust parameters used for cellular communications between a RAN and user devices. The RIC and RAN components can apply a set of actions to adjust the parameters more quickly and with less overhead than, e.g., adjustment of radio resource control (RRC) parameters. Parameters adjusted according to the techniques herein can include downlink control information (DCI) parameters and medium access control (MAC) control element (CE) parameters. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 4G, 5G, or other next generation networks, the disclosed aspects are not limited to a 4G or 5G implementation, and/or other network next generation implementations, such as sixth generation (6G), as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates an example wireless communication system configured for fast adjustment of RAN parameters, in accordance with various aspects and embodiments of the subject disclosure. The example wireless communication system 100 comprises communication service provider network(s) 110, RAN 120, and user equipment (UEs) 131, 132. The communication service provider network(s) 110 include a RIC 111, and the RIC 111 comprises an xApp 112. The RAN 120 includes a DU 121, and radio units (RUs)/network nodes 122, 124. The RU/network node 122 communicates with UEs 131, 132.

In FIG. 1, the uplink and downlink communications of UEs 131, 132 with RUs/network nodes such as RU/network node 122 can be subject to various parameter settings, including, for example, DCI parameters and MACCE parameters. In some embodiments of this disclosure, the xApp 112 at the RIC 111 can be configured to determine parameters such as the DCI parameters and MACCE parameters, and the RIC 111 can be configured to provide determined parameters to the RAN 120, e.g., to the DU 121, for use in connection with the uplink and downlink communications of UEs 131, 132.

Example operations that can be performed in connection with an architecture such as illustrated in FIG. 1 can include, e.g., initially exchanging information between the xApp 112 and the DU 121, in order to determine the set of parameters that can be adjusted by the xApp 112. The xApp 112 can comprise an application configured to execute at the RIC 111, and the xApp 112 can optionally be enabled by machine learning. Next, the xApp 112 can request performance information, such as key performance indicators (KPIs) 151 from the DU 121, and the DU 121 can provide the requested KPIs 151 to the xApp 112. The xApp 112 can use the received KPIs 151 to determine parameter configurations 152 for use in connection with RAN 120 communications with the UEs 131, 132. The RIC 111 can then provide the parameter configurations 152 to the DU 121. The DU 121 can be configured to receive and implement the parameter configurations 152 within the RAN 120.

In some embodiments, the RIC 111 can be configured to collect network KPIs 151, compare the KPIs 151 against target values, and calculate parameter configurations 152 that can be used by RAN nodes. RAN nodes can include, e.g., the DU 121, RUs 122, 124, and/or central units (CUs).

This disclosure introduces a new set of actions for the RIC 111 that correspond to parameters and messages which can be applied in the network 100 faster than RRC parameters, and with lower overhead. In some embodiments, DCI parameters can be adjusted according to the teachings herein. DCI parameters can be used for user data scheduling in both downlink and uplink. The RIC 111 can be configured to set limits (min or max) on DCI parameters, or the RIC 111 can be configured to provide a single recommended value (per parameter) for each user equipment 131, 132, and the recommended values can be applied during scheduling by RAN 120 components. Parameters can optionally be communicated to the user equipment 131, 132 at a smallest available time granularity (e.g., one millisecond (ms) or less).

In some embodiments, MACCE parameters can be adjusted according to the teachings herein. MACCE parameters can be adjusted by sending MACCE commands to UEs 131, 132. MACCE commands can be sent and acknowledged at the MAC layer level, and thus MACCE commands can be communicated at fast speeds and high frequencies between the network 100 and UEs 131, 132. The DU 121 can be configured to forward MACCE commands directly to the UEs 131, 132 and wait for UE 131, 132 acknowledgments to start using new MACCE configurations.

Both the RIC 111 and the DU 121 can be configured to exchange parameter information in order to understand which parameters are "RIC-configurable" according to the techniques described herein. The RIC 111 can be configured to determine parameter configurations 152 for parameters that are "RIC-configurable" at the DU 121. The DU 121 can be configured to receive and apply the parameter configurations 152 while serving its connected UEs 131, 132. Methods according to this disclosure can therefore include negotiation between the RIC 111 and the DU 121 to establish the supported "RIC-configurable" DCI and MACCE parameters that can be considered by the RIC 111, to ensure compatibility between the RIC 111, the DU 121 and the UEs 131, 132.

TABLE 1, below, provides example DCI parameters that can be configured by a RIC 111 some embodiments. Any of the listed DCI parameters, or any group of multiple listed DCI parameters, can optionally be configured by a RIC 111 in accordance with embodiments of this disclosure. TABLE 1 furthermore includes example allowed values, wherein a DCI parameter can optionally be set to a value within a range of the allowed values. In some embodiments, a DCI parameter can optionally be set to include a range of the allowed values.

TABLE 1

| DCI Parameter | Allowed Values |
|---|---|
| Identifier for DCI formats | 1 |
| Carrier indicator | 0 . . . 1 |
| Frequency domain resource assignment | Type0/Type1 |
| Time domain resource assignment | 0 . . . 15 |
| VRB-to-PRB mapping | 0 . . . 1 |
| Modulation and coding scheme | 0 . . . 31 |
| New data indicator | 0 . . . 1 |
| Redundancy version | 0 . . . 3 |
| HARQ process number | 0 . . . 15 |
| Downlink assignment index | 0 . . . 3 |
| PUCCH resource indicator | 0 . . . 7 |
| PDSCH-to-HARQ_feedback timing indicator | 0 . . . 7 |
| Antenna port(s) and number of layers | 0 . . . 31 |
| Transmission configuration indication | 0 . . . 7 |

In TABLE 1, VRB-to-PRB mapping refers to a virtual resource block (VRB) to physical resource block (PRB) mapping. HARQ process number refers to a hybrid automatic repeat request (HARQ) process number. PUCCH resource indicator refers to a physical uplink control channel (PUCCH) resource indicator. PDSCH-to-HARQ_feedback timing indicator refers to a physical data shared channel (PDSCH) to HARQ feedback timing indicator.

TABLE 2, below, provides example MACCE parameters that can be configured by a RIC 111 some embodiments. MACCE parameters can be set using MACCE codepoints/indices, and corresponding logical channel identifier (LCID) values. Any of the listed MACCE parameters, or any group of multiple listed MACCE parameters, can optionally be configured by a RIC 111 in accordance with embodiments of this disclosure. LCID values can be used to provide an activate/deactivate command, or to provide a parameter value or other parameter information.

TABLE 2

| MACCE Codepoint/Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |

TABLE 2-continued

| MACCE Codepoint/Index | LCID values |
|---|---|
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

In TABLE 2, CCCH refers to common control channel. eLCID field refers to extended LCID. SP ZP CSI-RS Resource Set refers to a semi-persistent (SP) zero power (ZP) channel state information (CSI) reference signal (RS) resource set. SP SRS refers to a SP sounding reference signal (SRS). TCI State refers to a transmission configuration indicator (TCI) state. CSI-IM refers to a CSI-interference measurement (IM). DRX refers to a discontinuous reception interval.

In general, with reference to FIG. 1, the non-limiting term "user equipment" can refer to any type of device that can communicate with network nodes 122, 124 in a cellular or mobile communication system 100. UEs 131, 132 can have one or more antenna panels having vertical and horizontal elements. Examples of UEs 131, 132 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 131, 132 can also comprise IOT devices that communicate wirelessly.

In various embodiments, system 100 comprises communication service provider network(s) 110 serviced by one or more wireless communication network providers. Communication service provider network(s) 110 can comprise a "core network". In example embodiments, UEs 131, 132 can be communicatively coupled to the communication service provider network(s) 110 via network nodes 122, 124. The network nodes 122, 124 (e.g., network node devices) can communicate with UEs 131, 132, thus providing connectivity between the UEs 131, 132 and the wider cellular network. The UEs 131, 132 can send transmission type recommendation data to the network nodes 122, 124. The transmission type recommendation data can comprise a recommendation to transmit data via a closed loop multiple input multiple output (MIMO) mode and/or a rank-1 precoder mode.

Network nodes 122, 124 can each have a cabinet and other protected enclosures, computing devices, an antenna mast, and multiple antennas for performing various transmission operations (e.g., MIMO operations) and for directing/steering signal beams. Network nodes 122, 124 can each comprise one or more base station devices which implement features of the network node. Network nodes can serve several cells, depending on the configuration and type of antenna. In example embodiments, UEs 131, 132 can send and/or receive communication data via wireless links to the network nodes 122, 124. The dashed arrow lines from the network nodes 122, 124 to the UEs 131, 132 represent downlink (DL) communications to the UEs 131, 132. The solid arrow lines from the UEs 131, 132 to the network nodes 122, 124 represent uplink (UL) communications.

Communication service provider networks 110 can facilitate providing wireless communication services to UEs 131, 132 via the network nodes 122, 124 and/or various additional network devices (not shown) included in the one or more communication service provider networks 110. The one or more communication service provider networks 110 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 110 can be or comprise the wireless communication network and/or various additional devices and components of the wireless communication network (e.g., additional network devices and cell, additional UEs, network server devices, etc.).

The network nodes 122, 124 can be connected to the one or more communication service provider networks 110 via one or more backhaul links. The one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also comprise wireless link components, such as but not limited to, line-of-sight (LOS) or non-LOS links which can comprise terrestrial air-interfaces or deep space links (e.g., satellite communication links for navigation). Backhaul links can be implemented via a "transport network" in some embodiments. In another embodiment, network nodes 122, 124 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UEs 131, 132 and the network nodes 122, 124). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 131, 132 and the network nodes 122, 124) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
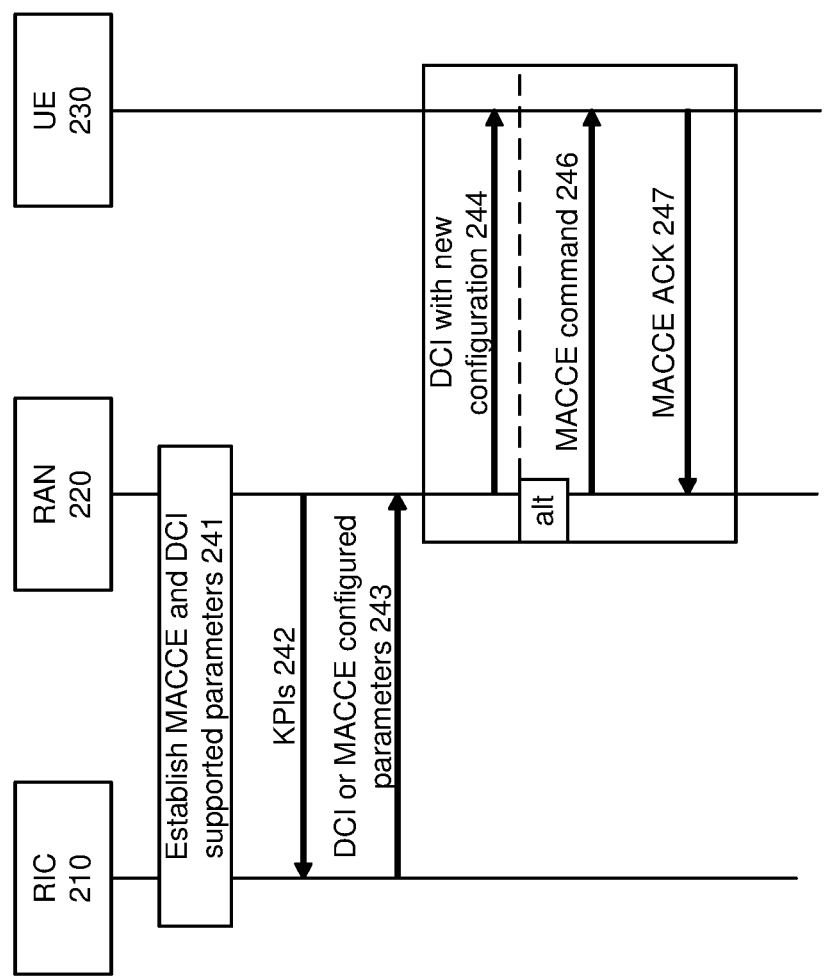
FIG. 2 illustrates example interactions of a RIC, a RAN, and a user equipment (UE), in accordance with various aspects and embodiments of the subject disclosure.

FIG. 2 illustrates example interactions of a RIC, a RAN, and a user equipment (UE), in accordance with various aspects and embodiments of the subject disclosure. FIG. 2 includes RIC 210, RAN 220, and UE 230. At operation 241, the RIC 210 and the RAN 220 can establish MACCE and DCI supported parameters, e.g., "RIC-configurable" parameters. The RAN 220 can provide KPIs 242 to the RIC 210. The RIC 210 can determine and then provide to the RAN 220 any DCI or MACCE configured parameters 243. After receiving configured parameters 243, the RAN 220 can implement the configured parameters 243 in connection with communications with the UE 230. For example, for DCI parameters, the RAN 220 can provide DCI with new configuration 244 to the UE 230. Alternatively, for MACCE parameters, the RAN 220 can provide a MACCE command 246 to the UE 230, and the UE 230 can implement the MACCE command 246 and send an acknowledgment MACCE ACK 247 to the RAN 220.

In some embodiments, at operation 241, the RIC 210 can send to the RAN 220 a list of potential MACCE commands and DCI parameters that are available to be configured/optimized periodically by the RIC 210. The RAN 220, e.g., a DU in the RAN 220 can send a confirmation to the RIC 210 to indicate the supported MACCE commands and DCI parameters from among those sent by the RIC 210. Parameters for which RIC based configuration is not supported by the RAN 220 can be rejected by the RAN 220.

At operations 242 and 243, the RIC 210 can request the RAN 220 to report KPI measurements that will trigger optimization actions, e.g., parameter reconfiguration, at the RIC 210. The RIC 210 can use the returned KPIs 242 to check for parameters that are adjustable by the RAN 220 as determined by operation 241 and are also set at incorrect/inefficient configuration settings, such that parameter adjustment can improve service to the UE 230. When such a parameter is identified, then at operation 243, the RIC 210 can send a parameter adjustment action to the RAN 220, e.g., by sending DCI or MACCE configured parameters 243 to a DU of the RAN 220 via an O-RAN defined E2 interface.

At operation 244, for DCI parameters, the RAN 220 can apply the RIC recommendation from 243 in a data transmission to the UE 230. For MACCE commands, at operation 246, the RAN 220 can send a MACCE command 246 and wait for the MACCE ACK 247 from the UE 230 before the RAN 220 begins using a MACCE configuration corresponding to the MACCE command 246 in the RAN 220 data scheduling of transmissions to the UE 230.

Figure 3:
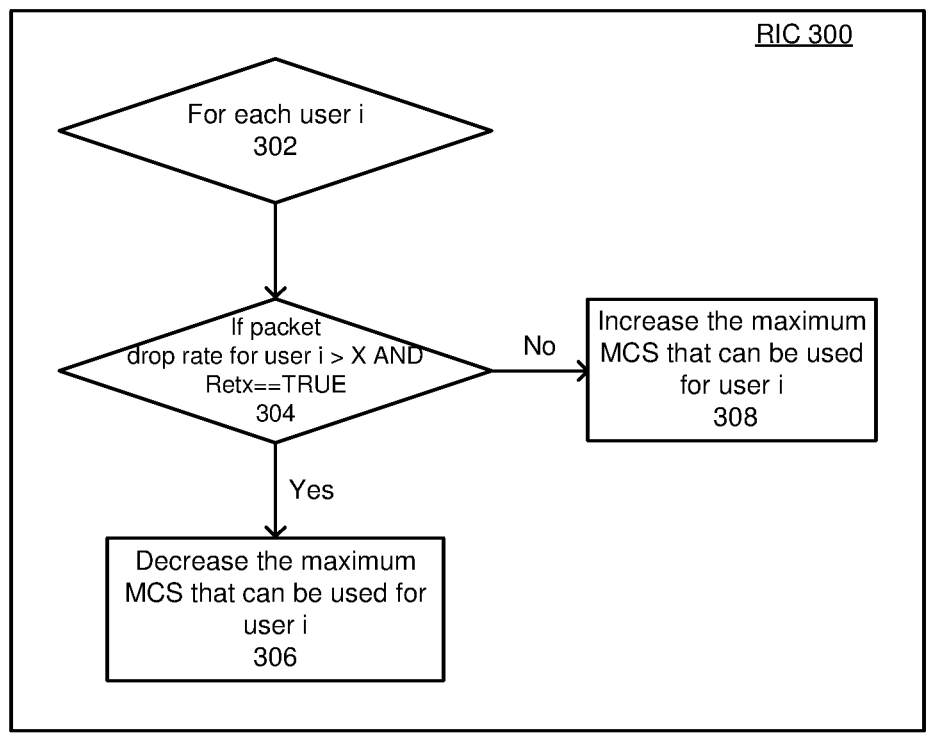
FIG. 3 illustrates example operations of a RIC in connection with adjusting downlink control information (DCI) parameters, in accordance with various aspects and embodiments of the subject disclosure.

FIG. 3 illustrates example operations of a RIC in connection with adjusting downlink control information (DCI) parameters, in accordance with various aspects and embodiments of the subject disclosure. FIG. 3 illustrates operations to adjust a modulation and coding scheme (MCS) parameter, which is a DCI parameter that can be adjusted by a RIC 300 in order to minimize packet delay. Other DCI parameters can similarly be adjusted by the RIC 300 using techniques similar to MCS adjustment techniques.

FIG. 3 includes, "for each user i" 302, "if packet drop rate for user i>X AND Retx==TRUE" 304, "decrease the maximum MCS that can be used for user i" 306. If no, then "increase the maximum MCS that can be used for user i" 308. In FIG. 3, for a given user i, the RIC 300 can check whether the user device packet drop rate is larger than a predetermined threshold value X. The RIC 300 can furthermore check whether a retransmission flag is set to TRUE. If the packet drop rate exceeds the predetermined threshold value X and the retransmission flag is set to TRUE then the MCS parameter for the user can be adjusted by decreasing a maximum MCS parameter value. The adjusted MCS parameter value can be sent to the RAN as described in connection with FIG. 2.

Figure 4:
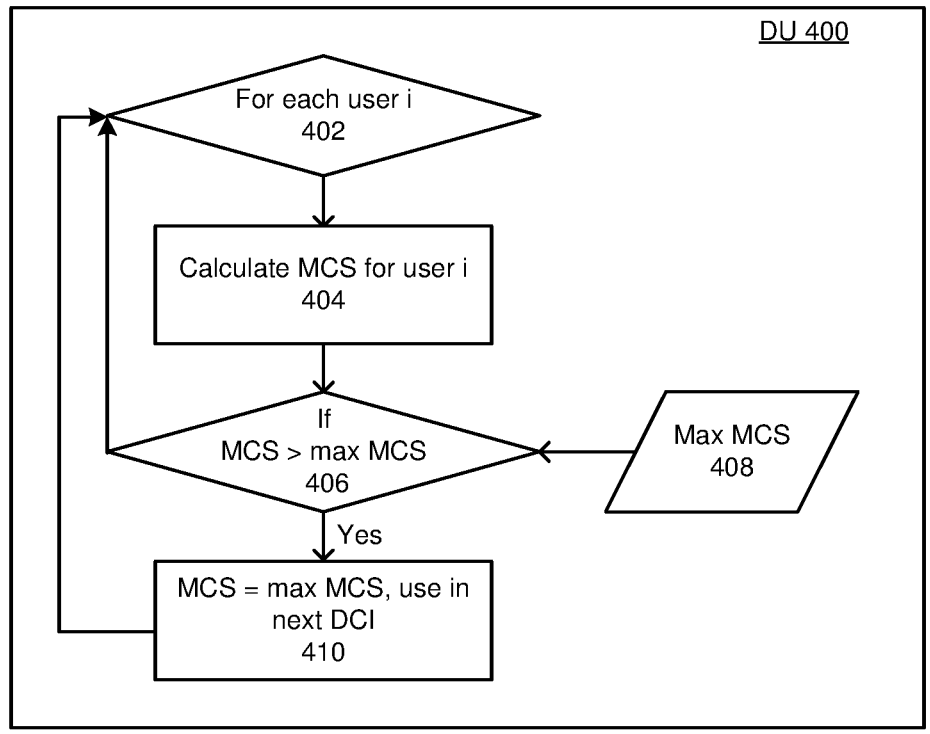
FIG. 4 illustrates example operations of a RAN element, such as a distributed unit (DU), in connection with DCI parameter adjustment, in accordance with various aspects and embodiments of the subject disclosure.

FIG. 4 illustrates example operations of a RAN element, such as a distributed unit (DU), in connection with DCI parameter adjustment, in accordance with various aspects and embodiments of the subject disclosure. In FIG. 4, the DU 400 can receive and apply a maximum MCS parameter 408, which was generated at the RIC 300 according to FIG. 3. Other DCI parameters generated at the RIC 300 can similarly be applied by the DU 400 using techniques similar to the illustrated MCS adjustment techniques.

FIG. 4 includes, "for each user i" 402, "calculate MCS for user i" 404, "if MCS>max MCS" 406, and "MCS=max MCS, use in next DCI" 410. In FIG. 4, for a given user i, the DU 400 can calculate a user device MCS value. If the calculated MCS value is greater than the max MCS 408 received from the RIC, then the user device's MCS can be adjusted, e.g., by setting the MCS value to the max MCS 408 received from the RIC. Alternatively, if the calculated MCS value is not greater than the max MCS 408 received from the RIC, then the DU 400 can proceed to a next user.

Figure 5:
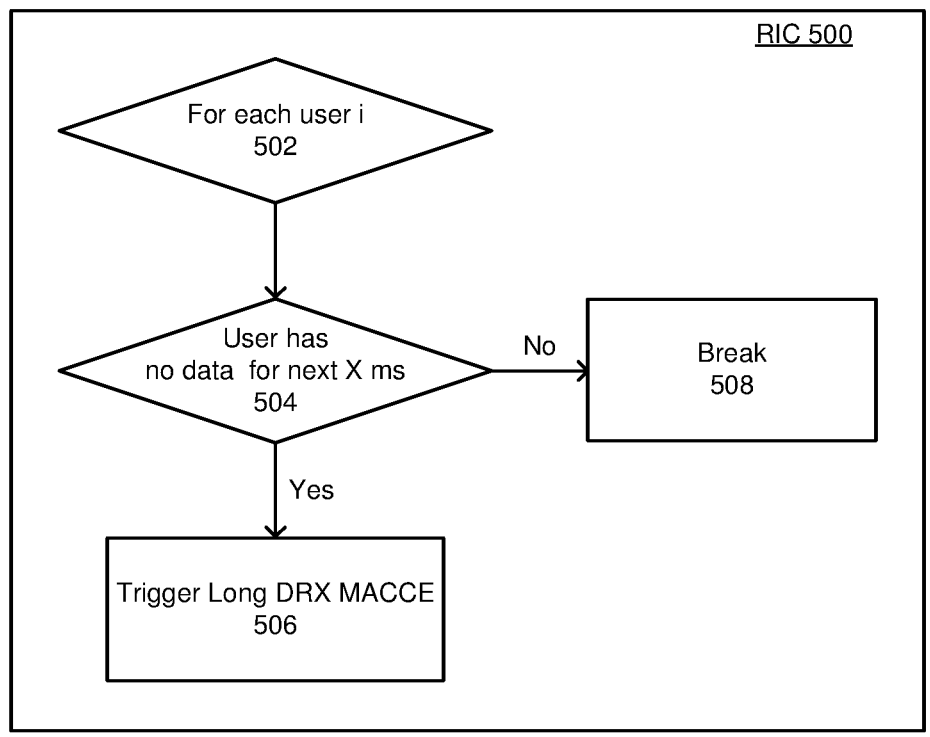
FIG. 5 illustrates example operations of a RIC in connection with adjusting medium access control (MAC) control element (CE) parameters, in accordance with various aspects and embodiments of the subject disclosure.

FIG. 5 illustrates example operations of a RIC in connection with adjusting medium access control (MAC) control element (CE) parameters, in accordance with various aspects and embodiments of the subject disclosure. FIG. 5 illustrates operations to adjust a discontinuous reception interval (DRX) parameter, which is a MACCE parameter that can be adjusted by a RIC 500 in order to minimize UE power consumption when the UE is not expected to have any data transmission in the near-term. Other MACCE parameters can similarly be adjusted by the RIC 500 using techniques similar to the illustrated DRX adjustment techniques.

FIG. 5 includes, "for each user i" 502, "user has no data for next X ms" 504, and "trigger long DRX MACCE" 506. If no, then "break" 508. In FIG. 5, for a given user i, the RIC 500 can check whether the user device has no data scheduled for delivery during a predetermined threshold time interval X. If the user device has no data scheduled for delivery during a predetermined threshold time interval X, then the RIC 500 can send a long DRX MACCE command to the RAN, which commands the RAN to use a longer DRX for the user equipment.

Figure 6:
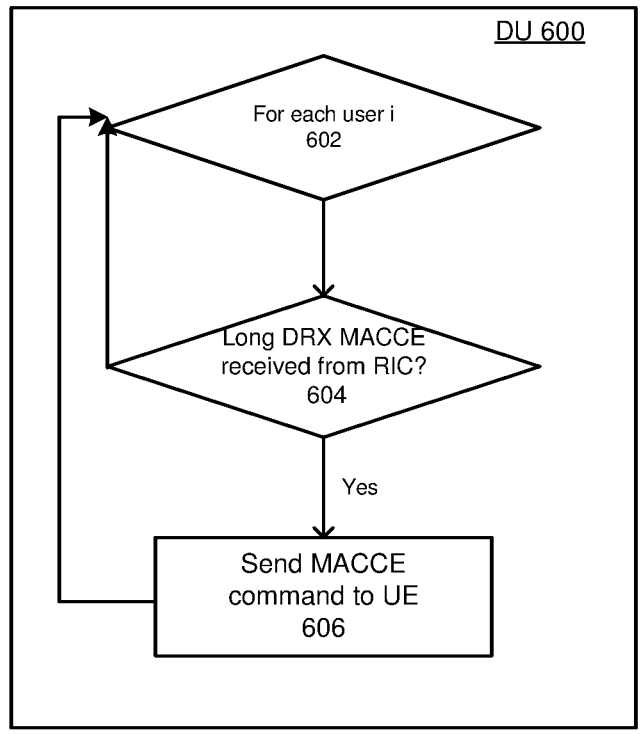
FIG. 6 illustrates example operations of a RAN element, such as a DU, in connection with MACCE parameter adjustment, in accordance with various aspects and embodiments of the subject disclosure.

FIG. 6 illustrates example operations of a RAN element, such as a DU, in connection with MACCE parameter adjustment, in accordance with various aspects and embodiments of the subject disclosure. In FIG. 6, the DU 600 can receive and apply a long DRX MACCE command/parameter, which was generated at the RIC 500 according to FIG. 5. Other MACCE parameters generated at the RIC 500 can similarly be applied by the DU 600 using techniques similar to the illustrated DRX adjustment techniques.

FIG. 6 includes, "for each user i" 602, "long DRX MACCE received from RIC?" 604, and "send MACCE command to UE" 606. In FIG. 6, for a given user i, if the DU 600 has received a long DRX MACCE command pertaining to the UE from the RIC, then the DU 600 can implement the long DRX for the UE by sending the MACCE command to the UE.

Figure 7:
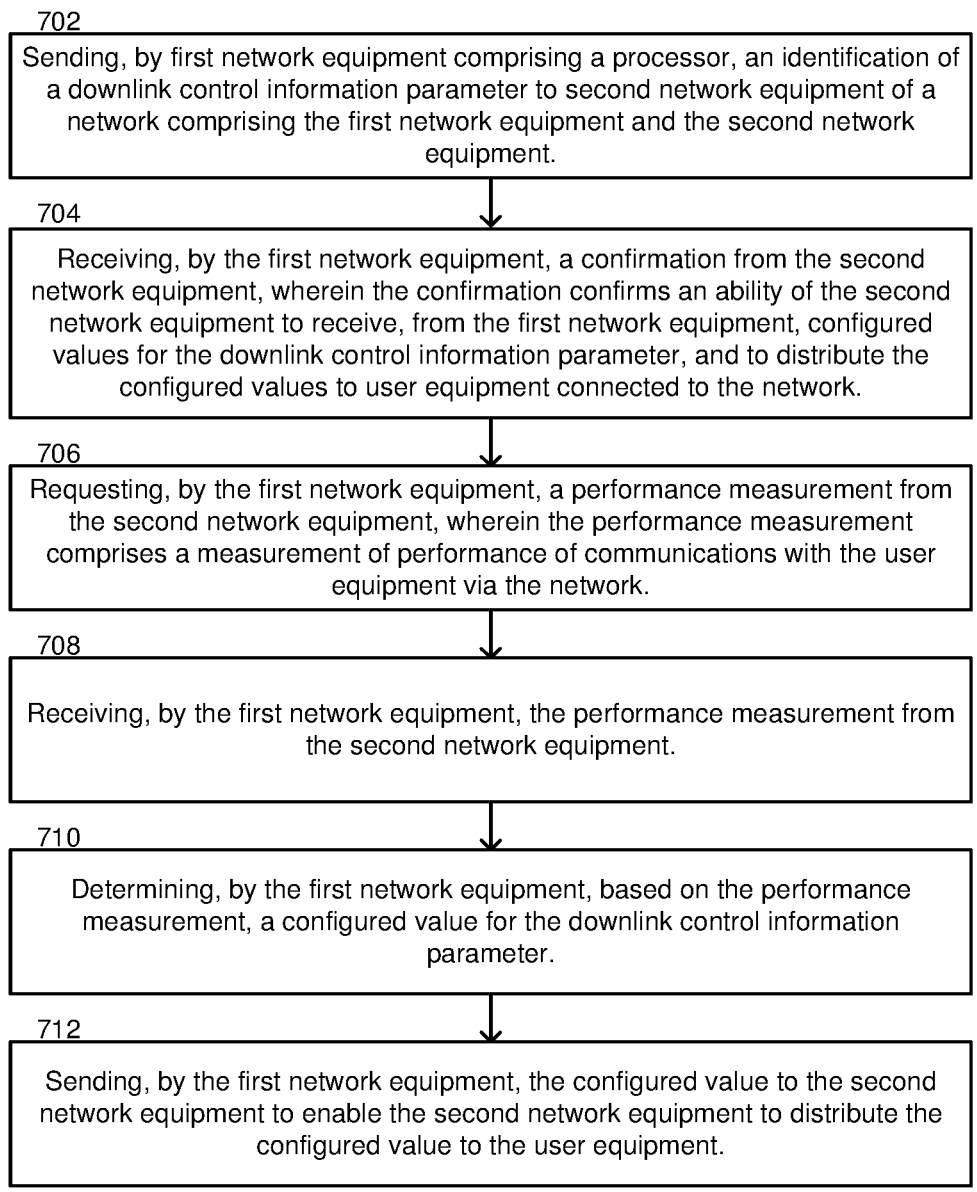
FIG. 7 is a flow diagram representing example operations of network equipment such as a RIC in connection with adjusting DCI parameters, in accordance with various aspects and embodiments of the subject disclosure.

FIG. 7 is a flow diagram representing example operations of network equipment such as a RIC in connection with adjusting DCI parameters, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by first network equipment comprising a RIC, such as the RIC 210 illustrated in FIG. 2. Example operation 702 comprises sending, by first network equipment 210 comprising a processor, an identification of a downlink control information parameter to second network equipment (e.g., RAN 220) of a network comprising the first network equipment 210 and the second network equipment 220. The second network equipment 220 can comprise a DU of the network.

In some embodiments, operation 702 can be included in the operation 241, illustrated in FIG. 2. The identification of the downlink control information parameter sent by operation 702 can be included in a list of identifications of downlink control information parameters. The downlink control information parameter, or other parameters on the list, can comprise, e.g., parameters listed on TABLE 1, such as a frequency domain resource assignment, a time domain resource assignment, a modulation and coding scheme (MCS) assignment, a hybrid automatic repeat request (HARQ) process number assignment, a physical uplink control channel (PUCCH) resource indicator, a physical data shared channel (PDSCH) to HARQ timing indicator, or an antenna port assignment.

Operation 704 comprises receiving, by the first network equipment 210, a confirmation from the second network equipment 220, wherein the confirmation confirms an ability of the second network equipment 220 to receive, from the first network equipment 210, configured values for the downlink control information parameter, and to distribute the configured values to user equipment 230 connected to the network. In some embodiments, operation 704 can be included in the operation 241, illustrated in FIG. 2. The confirmation can optionally confirm the ability of the second network equipment 220 to receive and distribute configured values for downlink control information parameters of the list of identifications of downlink control information parameters. Any parameters that are not RIC-configurable at the RAN 220 can be rejected rather than confirmed.

Operation 706 comprises requesting, by the first network equipment 210, a performance measurement, e.g., one or more of KPIs 242, from the second network equipment 220, wherein the performance measurement 242 comprises a measurement of performance of communications with the user equipment 230 via the network. In some embodiments, requesting the performance measurement 242 from the second network equipment 220 can be subsequent to receiving the confirmation from the second network equipment 220, pursuant to operation 704. In other embodiments, the RIC 210 can optionally use KPIs that are previously or otherwise reported to the RIC 210. Operation 708 comprises receiving, by the first network equipment 210, the performance measurement 242 from the second network equipment 220.

Operation 710 comprises determining, by the first network equipment 210, based on the performance measurement 242, a configured value, e.g., a parameter of parameters 243, for the downlink control information parameter (i.e., the parameter identified pursuant to operation 702). Operation 710 can comprise, e.g., operations of a RIC 300 described in connection with FIG. 3. In some embodiments, the configured value for the downlink control information parameter can optionally comprise a range of configured values for the downlink control information parameter, or a maximum or minimum value for the parameter. Operation 712 comprises sending, by the first network equipment 210, the configured value to the second network equipment 220, e.g., by including the configured value among parameters 243, to enable the second network equipment 220 to distribute the configured value to the user equipment 230.

Figure 8:
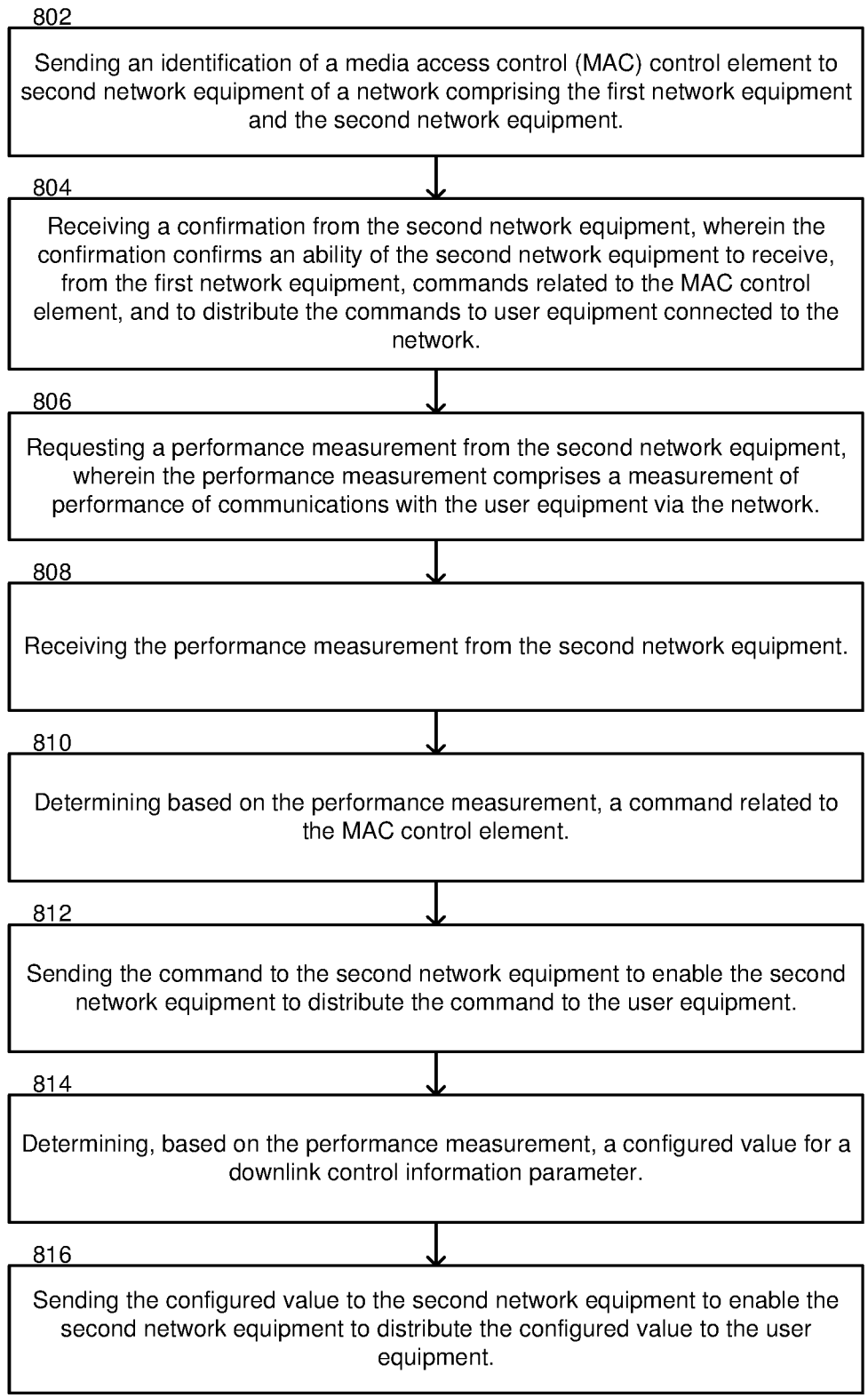
FIG. 8 is a flow diagram representing example operations of network equipment such as a RIC in connection with adjusting MACCE parameters, in accordance with various aspects and embodiments of the subject disclosure.

FIG. 8 is a flow diagram representing example operations of network equipment such as a RIC in connection with adjusting MACCE parameters, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by first network equipment comprising a RIC, such as the RIC 210 illustrated in FIG. 2. Example operation 802 comprises sending an identification of a medium access control (MAC) control element to second network equipment 220 of a network comprising the first network equipment 210 and the second network equipment 220. The second network equipment can comprise a DU of the network.

In some embodiments, operation 802 can be included in the operation 241, illustrated in FIG. 2. The identification of the MAC control element sent by operation 802 can be included in a list of identifications of MAC control elements. The MAC control element, or other MAC control elements on the list, can comprise, e.g., parameters listed on TABLE 2, such as a common control channel (CCCH) command, a logical channel command, a recommended bit rate command, a channel state information (CSI) command, a cell activation command, a discontinuous reception interval (DRX) command, a timing advance command, a user equipment contention resolution identity command, or a padding command.

Operation 804 comprises receiving a confirmation from the second network equipment 220, wherein the confirmation confirms an ability of the second network equipment 220 to receive, from the first network equipment 210, commands related to the MAC control element, and to distribute the commands to user equipment 230 connected to the network. In some embodiments, operation 804 can be included in the operation 241, illustrated in FIG. 2. The confirmation can optionally confirm the ability of the second network equipment 220 to receive and distribute commands for MAC control elements of the list of identifications of MAC control elements. Any MAC control elements which are not RIC-configurable at the RAN 220 can be rejected by the second network equipment 220.

Operation 806 comprises requesting a performance measurement, e.g., one or more of KPIs 242, from the second network equipment 220, wherein the performance measurement 242 comprises a measurement of performance of communications with the user equipment 230 via the network. As explained above with regard to operation 706, in some embodiments, requesting the performance measurement 242 from the second network equipment 220 can be subsequent to receiving the confirmation from the second network equipment 220, pursuant to operation 804. In other embodiments, the RIC 210 can optionally use KPIs that are previously or otherwise reported to the RIC 210. Operation 808 comprises receiving, by the first network equipment 210, the performance measurement 242 from the second network equipment 220.

Operation 810 comprises determining based on the performance measurement 242, a command related to the MAC control element, i.e., a command related to the MAC control element identified at operation 802. The MACCE command can comprise a parameter of parameters 243. Operation 810 can comprise, e.g., operations of a RIC 500 described in connection with FIG. 5. In some embodiments, the command related to the MAC control element can optionally comprise MACCE commands such as listed in TABLE 2. Operation 812 comprises sending the command to the second network equipment 220 to enable the second network equipment 220 to distribute the command to the user equipment 230. For example, the RIC 210 can include the command among parameters 243, to enable the second network equipment 220 to distribute the command to the user equipment 230.

Operations 814 and 816 are directed to furthermore determining DCI parameters for use by the RAN 220 and the UE 230. Operation 814 comprises determining, based on the performance measurement 242, a configured value for a downlink control information parameter, such as described in connection with operation 710. The operation 814 can optionally use the same performance measurement(s) 242 collected pursuant to operation 808. Operation 816 comprises sending the configured value (determined pursuant to operation 814) to the second network equipment 220 to enable the second network equipment 220 to distribute the configured value to the user equipment 230.

Figure 9:
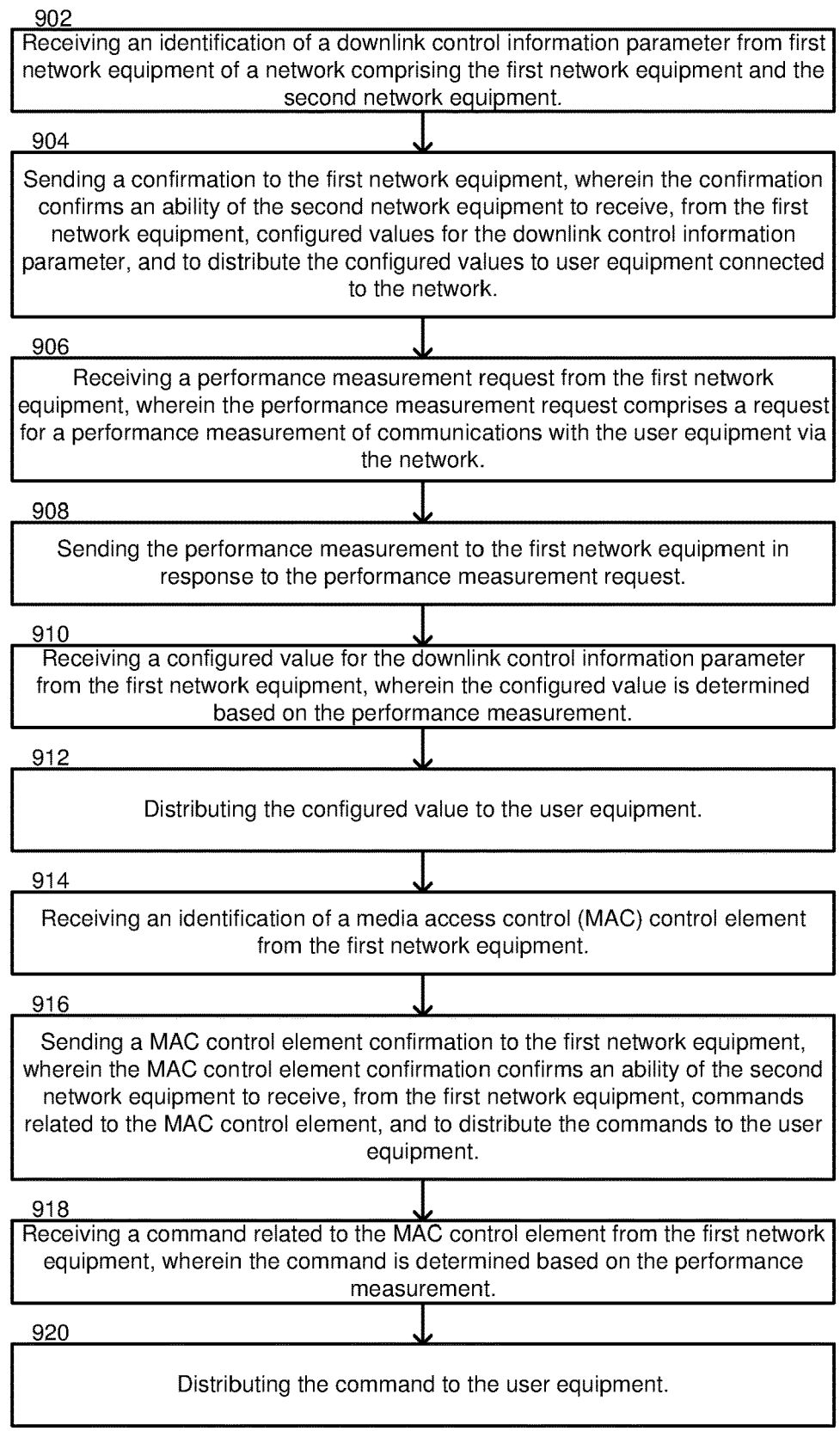
FIG. 9 is a flow diagram representing example operations of network equipment such as a DU in connection with adjusting DCI and/or MACCE parameters, in accordance with various aspects and embodiments of the subject disclosure.

FIG. 9 is a flow diagram representing example operations of network equipment such as a DU in connection with adjusting DCI and/or MACCE parameters, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by second network equipment comprising a DU, such as the RAN 220 illustrated in FIG. 2. Example operation 902 comprises receiving an identification of a downlink control information parameter from first network equipment, e.g., from the RIC 210, of a network comprising the first network equipment 210 and the second network equipment 220.

The identification of the downlink control information parameter can optionally be included in a list of identifications of downlink control information parameters, exchanged pursuant to operation 241 in FIG. 2. The downlink control information parameter and/or other parameters on the list can include parameters included in TABLE 1, e.g., a frequency domain resource assignment, a time domain resource assignment, a modulation and coding scheme (MCS) assignment, a hybrid automatic repeat request (HARQ) process number assignment, a physical uplink control channel (PUCCH) resource indicator, a physical data shared channel (PDSCH) to HARQ timing indicator, or an antenna port assignment.

Example operation 904 comprises sending a confirmation to the first network equipment 210, wherein the confirmation confirms an ability of the second network equipment 220 to receive, from the first network equipment 210, configured values for the downlink control information parameter, and to distribute the configured values to user equipment 230 connected to the network. In some embodiments, the confirmation can confirm the ability of the second network equipment 220 to receive and distribute configured values for downlink control information parameters of the list of identifications of downlink control information parameters.

Example operation 906 comprises receiving a performance measurement request from the first network equipment 210, wherein the performance measurement request comprises a request for a performance measurement of communications with the user equipment 230 via the network. Example operation 908 comprises sending the performance measurement, e.g., one or more of KPIs 242, to the first network equipment 210 in response to the performance measurement request. The RIC 210 can use the KPIs 242 to determine configured value(s) for parameters 243.

Example operation 910 comprises receiving a configured value for the downlink control information parameter from the first network equipment 210, wherein the configured value is determined based on the performance measurement 242. For example, the RAN 220 can receive configured parameters 243. Example operation 910 comprises distributing the configured value 243 to the user equipment 230. The RAN 220 can perform, e.g., operations such as operations of DU 400 illustrated in FIG. 4 to distribute parameters to UEs.

Operations 914-920 relate to furthermore receiving and applying MACCE commands. Example operation 914 comprises receiving an identification of a medium access control (MAC) control element from the first network equipment 210. Operation 916 comprises sending a MAC control element confirmation to the first network equipment 210, wherein the MAC control element confirmation confirms an ability of the second network equipment 220 to receive, from the first network equipment 210, commands related to the MAC control element, and to distribute the commands to the user equipment 230. The operations 914 and 916 can be performed as part of operation 241 in FIG. 2.

Example operation 918 comprises receiving a command related to the MAC control element from the first network equipment 210, wherein the command is determined based on the performance measurement 242. The command can be included, e.g., among configured parameters 243. Example operation 920 comprises distributing the command to the user equipment 230.

Figure 10:
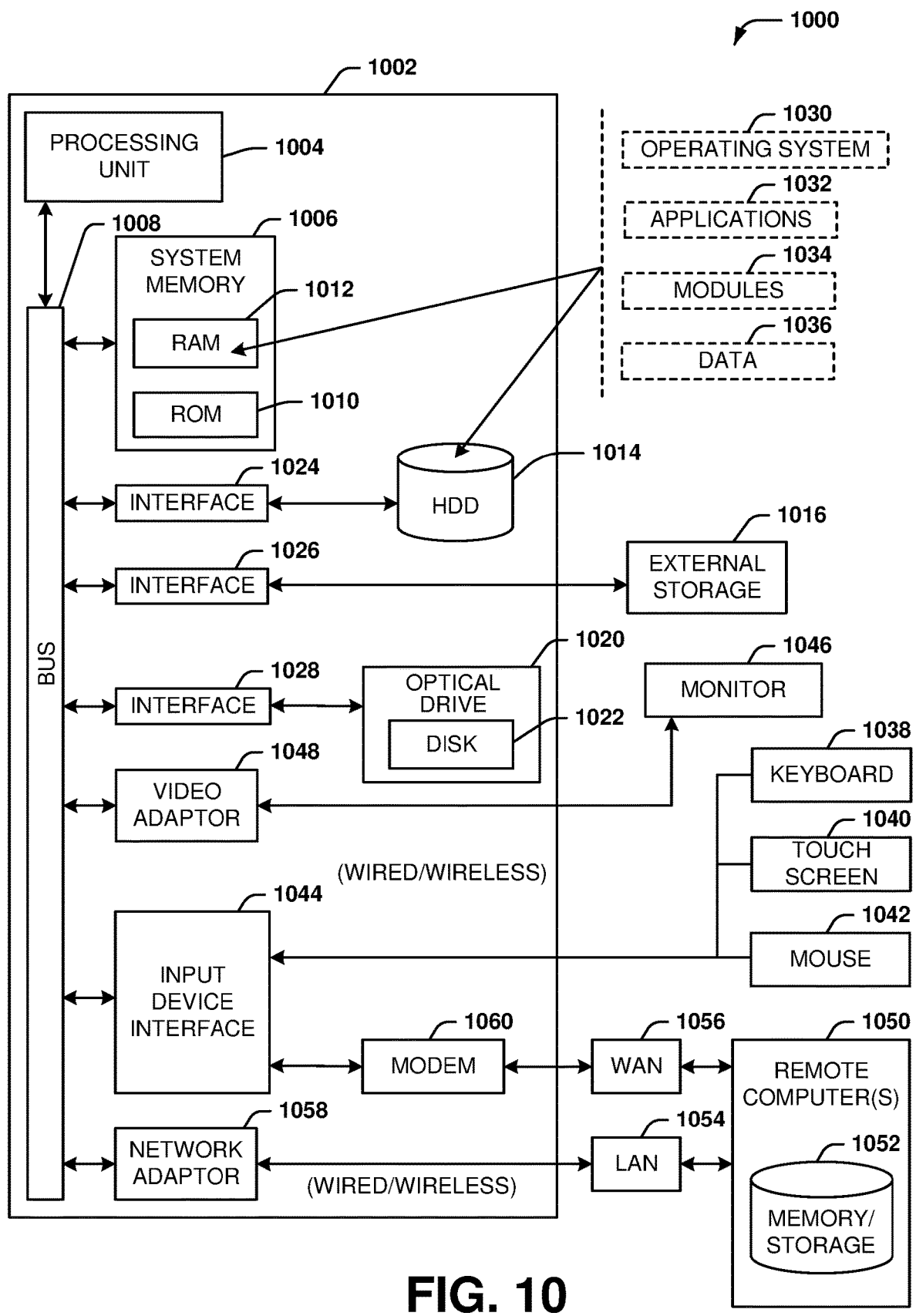
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-Ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
sending, by first network equipment comprising at least one processor, a first identification of a downlink control information parameter to second network equipment of a network comprising the first network equipment and the second network equipment;
receiving, by the first network equipment, a confirmation from the second network equipment,
wherein the confirmation confirms an ability of the second network equipment to receive, from the first network equipment, configured values for the downlink control information parameter, and to distribute the configured values to user equipment connected to the network;
requesting, by the first network equipment, a performance measurement from the second network equipment, wherein the performance measurement comprises a measurement of performance of communications with the user equipment via the network;
receiving, by the first network equipment, the performance measurement from the second network equipment;
determining, by the first network equipment, based on the performance measurement, a configured value for the downlink control information parameter;
sending, by the first network equipment, the configured value to the second network equipment to enable the second network equipment to distribute the configured value to the user equipment;
sending, by the first network equipment, a second identification of a medium access control (MAC) control element;
receiving, by the first network equipment, a MAC control element confirmation, wherein the MAC control element confirmation confirms an ability of the second network equipment to receive, from the first network equipment, commands related to the MAC control element, and to distribute the commands to the user equipment; and
sending, by the first network equipment, a command related to the MAC control element, wherein the command is determined based on the performance measurement.

2. The method of claim 1, wherein the downlink control information parameter comprises at least one of a frequency domain resource assignment, a time domain resource assignment, a modulation and coding scheme (MCS) assignment, a hybrid automatic repeat request (HARQ) process number assignment, a physical uplink control channel (PUCCH) resource indicator, a physical data shared channel (PDSCH) to HARQ timing indicator, or an antenna port assignment.

3. The method of claim 1, wherein the first identification of the downlink control information parameter is included in a list of identifications of downlink control information parameters, and wherein the confirmation confirms the ability of the second network equipment to receive and distribute configured values for downlink control information parameters of the list of identifications of downlink control information parameters.

4. The method of claim 1, wherein the first network equipment comprises a radio access network intelligent controller (RIC) of the network.

5. The method of claim 1, wherein the second network equipment comprises a digital unit (DU) of the network.

6. The method of claim 1, wherein the performance measurement comprises a key performance indicator (KPI) of the network.

7. The method of claim 1, wherein the configured value for the downlink control information parameter comprises a range of configured values for the downlink control information parameter.

8. The method of claim 1, wherein requesting the performance measurement from the second network equipment is subsequent to receiving the confirmation from the second network equipment.

9. First network equipment, comprising:
at least one processor; and
at least one memory that stores executable instructions that, when executed by the at least one processor, facilitate performance of operations, comprising:
sending a first identification of a downlink control information parameter to second network equipment of a network comprising the first network equipment and the second network equipment;
receiving a confirmation from the second network equipment, wherein the confirmation confirms an ability of the second network equipment to receive, from the first network equipment, configured values for the downlink control information parameter, and to distribute the configured values to user equipment connected to the network;
requesting a performance measurement from the second network equipment, wherein the performance measurement comprises a measurement of performance of communications with the user equipment via the network;
receiving the performance measurement from the second network equipment;
determining, based on the performance measurement, a configured value for the downlink control information parameter;
sending the configured value to the second network equipment to enable the second network equipment to distribute the configured value to the user equipment;
sending a second identification of a medium access control (MAC) control element to the second network;
receiving a MAC control element confirmation from the second network equipment, wherein the confirmation confirms an ability of the second network equipment to receive, from the first network equipment, commands related to the MAC control element, and to distribute the commands to the user equipment connected to the network;
determining, based on the performance measurement, a command related to the MAC control element; and
sending the command to the second network equipment to enable the second network equipment to distribute the command to the user equipment.

10. The first network equipment of claim 9, wherein the command related to the MAC control element comprises at least one of a common control channel (CCCH) command, a logical channel command, a recommended bit rate command, a channel state information (CSI) command, a cell activation command, a discontinuous reception interval (DRX) command, a timing advance command, a user equipment contention resolution identity command, or a padding command.

11. The first network equipment of claim 9, wherein the second identification of the MAC control element is included in a list of identifications of MAC control elements, and wherein the confirmation confirms the ability of the second network equipment to receive and distribute commands for MAC control elements of the list of identifications of MAC control elements.

12. The first network equipment of claim 9, wherein the first network equipment comprises a radio access network intelligent controller (RIC) of the network, and wherein the second network equipment comprises a digital unit (DU) of the network.

13. The first network equipment of claim 9, wherein the performance measurement comprises a key performance indicator (KPI) of the network.

14. The first network equipment of claim 9, wherein requesting the performance measurement from the second network equipment is subsequent to receiving the confirmation from the second network equipment.

15. The first network equipment of claim 9, wherein the configured value for the downlink control information parameter comprises a range of configured values for the downlink control information parameter.

16. A non-transitory machine-readable medium, comprising executable instructions that, when executed by at least one processor of second network equipment, facilitate performance of operations, comprising:
    receiving a first identification of a downlink control information parameter from first network equipment of a network comprising the first network equipment and the second network equipment;
    sending a confirmation to the first network equipment, wherein the confirmation confirms an ability of the second network equipment to receive, from the first network equipment, configured values for the downlink control information parameter, and to distribute the configured values to user equipment connected to the network;
    receiving a performance measurement request from the first network equipment, wherein the performance measurement request comprises a request for a performance measurement of communications with the user equipment via the network;
    sending the performance measurement to the first network equipment in response to the performance measurement request;
    receiving a configured value for the downlink control information parameter from the first network equipment, wherein the configured value is determined based on the performance measurement;
    distributing the configured value to the user equipment;
    receiving a second identification of a medium access control (MAC) control element from the first network equipment;
    sending a MAC control element confirmation to the first network equipment,
    wherein the MAC control element confirmation confirms an ability of the second network equipment to receive, from the first network equipment, commands related to the MAC control element, and to distribute the commands to the user equipment;
    receiving a command related to the MAC control element from the first network equipment, wherein the command is determined based on the performance measurement; and
    distributing the command to the user equipment.

17. The non-transitory machine-readable medium of claim 16, wherein the downlink control information parameter comprises at least one of a frequency domain resource assignment, a time domain resource assignment, a modulation and coding scheme (MCS) assignment, a hybrid automatic repeat request (HARQ) process number assignment, a physical uplink control channel (PUCCH) resource indicator, a physical data shared channel (PDSCH) to HARQ timing indicator, or an antenna port assignment.

18. The non-transitory machine-readable medium of claim 16, wherein the first identification of the downlink control information parameter is included in a list of identifications of downlink control information parameters, and wherein the confirmation confirms the ability of the second network equipment to receive and distribute configured values for downlink control information parameters of the list of identifications of downlink control information parameters.

19. The non-transitory machine-readable medium of claim 16, wherein the second network equipment comprises a digital unit (DU) of the network.

20. The non-transitory machine-readable medium of claim 16, wherein the configured value for the downlink control information parameter comprises a range of configured values for the downlink control information parameter.

* * * * *